Dec. 18, 1951     G. P. ROSE MILLER     2,579,339

LIQUID FEEDING DEVICE

Filed Oct. 11, 1949

INVENTOR.
GEORGE PATRICK ROSE-MILLER

BY

*Pennie, Edmonds, Morton, Barrows and Taylor*

ATTORNEYS

Patented Dec. 18, 1951

2,579,339

UNITED STATES PATENT OFFICE 2,579,339

LIQUID FEEDING DEVICE

George Patrick Rose Miller, Barevan, Cawdor, Nairn, Scotland

Application October 11, 1949, Serial No. 120,664
In Great Britain October 20, 1948

1 Claim. (Cl. 119—71)

This invention relates to improvements in devices for feeding milk or other liquid food to young animals, e. g., calves, and more particularly to feeding apparatus of the type including a vessel or bucket equipped with a resilient liquid-outlet teat.

A feeder device according to the invention includes a vessel serving as a container for the food, at least one tubular nozzle member fitted to the lower part of the vessel, a teat attached to the nozzle member, and a gravity-operated valve incorporated in said nozzle member and having a depending extension adapted to be moved upwardly by the mouth of the animal when sucking whereby to unseat the valve and permit flow of liquid through the teat.

The valve may comprise a metallic ball-head having a depending stem to the lower end of which is fitted a rubber knob which is located at the lower end of the nozzle member and is displaceable upwardly by the mouth of the animal. The ball-head may be sheathed in rubber so as to ensure that the ball-head, when seated, will be liquid-tight.

Figure 1:
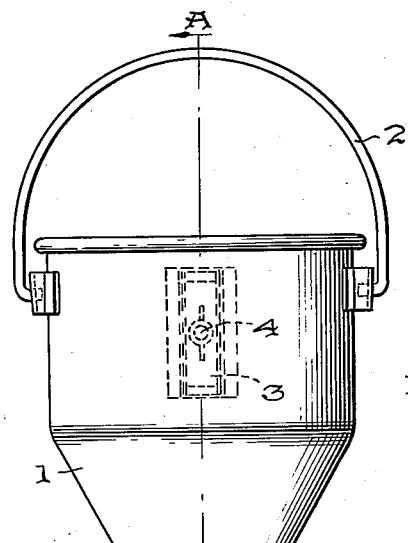
Figure 2:
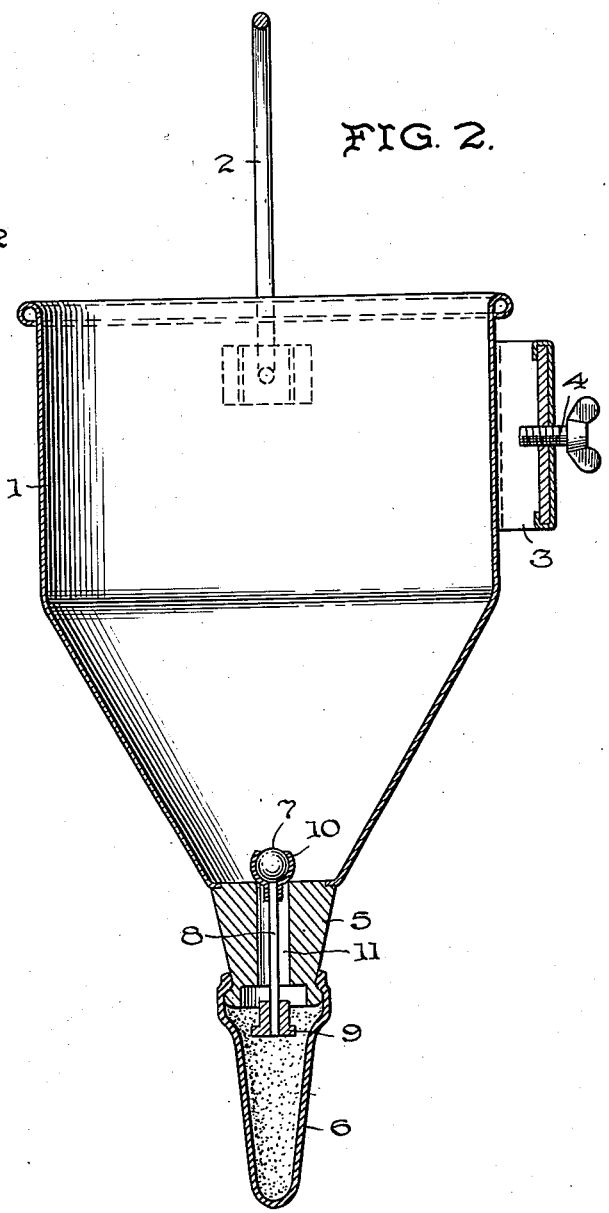
Figure 3:
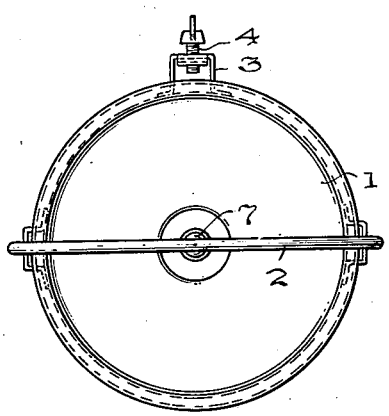

A feeder device according to the invention is illustrated in the accompanying drawings in which Fig. 1 is an elevation, Fig. 2 a section on the line A—A of Fig. 1, and Fig. 3 a plan view.

Referring to the drawings, the feeder device shown includes a downwardly-convergent vessel or bucket 1 equipped with a carrying handle 2, and with a bracket 3 and clamping screw 4 whereby the vessel may be attached to a support. Fitted to the lower end of the vessel 1 is a tubular nozzle 5 to which is attached a resilient liquid-outlet teat 6. The nozzle 5 incorporates a valve 7 having a depending extension 8 adapted to be operated by the animal when sucking whereby to control the flow of liquid through the teat. The depending extension 8 of the valve extends within the channel 11 through the nozzle 5, and the valve 7 is urged by gravitational force to close the upper entrance to the channel 11.

Thus, when the animal takes the teat 6 into its mouth, the valve 7 is moved upwardly and unseated and liquid flows from the vessel 1 into the channel 11 and from the channel through the teat. When the animal releases the teat, however, the valve 7 seats itself and the flow of liquid ceases.

The valve 7 comprises a metallic ball-head with a depending stem 8 to the lower end of which is fitted a rubber knob 9 which is located at the lower end of the nozzle 5 and is displaceable upwardly by the mouth of the animal. The valve 7 is sheathed in rubber tubing 10 so as to ensure that the ball-head, when seated, will be liquid-tight.

The complete valve assembly 7—10 is readily detachable from the nozzle 5 in order to facilitate sterilisation.

What is claimed is:

A feeder device for use in feeding liquid food to young animals, including a food-containing vessel, at least one tubular nozzle member fitted to the lower part of said vessel, said nozzle member having a channel extending therethrough and communicating with said food-containing vessel, a teat attached to said nozzle member having its upper end communicating with the lower end of said channel, and a gravity-operated valve incorporated in said nozzle member and seated at the upper entrance to said channel, said valve having a depending stem extending within said channel and projecting into said teat, said depending stem terminating in a knob disposed below the nozzle, said knob having a cross-sectional area substantially less than the adjacent inside area of the teat and being spaced therefrom, said knob and stem being adapted to be displaced upwardly by the mouth of the animal when sucking to unseat the valve temporarily, whereby the liquid flows through the channel and between the knob and the inner wall into the teat.

GEORGE PATRICK ROSE MILLER.

REFERENCES CITED

The following references are of record in the file of this patent:

FOREIGN PATENTS

| Number | Country | Date |
|---|---|---|
| 74,863 | Germany | July 13, 1893 |
| 286,847 | Italy | June 24, 1931 |